(12) United States Patent
Friedmann (10) Patent No.: US 8,584,593 B2
(45) Date of Patent: Nov. 19, 2013

(54) AQUATIC AND TERRESTRIAL TRANS-WEB INFRASTRUCTURE NETWORK SYSTEM (T.W.I.N.S.)

(76) Inventor: Jan Friedmann, Los Angeles, CA (US)

( * ) Notice: Subject to any disclaimer, the term of this patent is extended or adjusted under 35 U.S.C. 154(b) by 24 days.

(21) Appl. No.: 13/451,224

(22) Filed: Apr. 19, 2012

(65) Prior Publication Data

US 2013/0025493 A1    Jan. 31, 2013

Related U.S. Application Data

(60) Provisional application No. 61/512,759, filed on Jul. 28, 2011.

(51) Int. Cl.
  *B61B 13/10* (2006.01)
(52) U.S. Cl.
  USPC ..................... 104/138.1; 104/138.2
(58) Field of Classification Search
  USPC ............................. 104/138.1, 138.2
  See application file for complete search history.

(56) References Cited

U.S. PATENT DOCUMENTS

| | | | |
|---|---|---|---|
| 7,114,882 B1 * | 10/2006 | Friedmann | 405/194 |
| 8,006,625 B2 * | 8/2011 | Yang | 104/138.1 |
| 2006/0150858 A1 * | 7/2006 | Appleton | 104/138.1 |
| 2006/0233616 A1 * | 10/2006 | Friedmann | 405/224 |
| 2007/0214994 A1 * | 9/2007 | Ardente et al. | 104/138.1 |
| 2009/0101040 A1 * | 4/2009 | Yang | 104/138.1 |
| 2013/0025493 A1 * | 1/2013 | Friedmann | 104/138.1 |
| 2013/0125779 A1 * | 5/2013 | De Matias Jimenez | 104/138.1 |
| 2013/0136546 A1 * | 5/2013 | Friedmann | 406/181 |

* cited by examiner

*Primary Examiner* — Jason C Smith
(74) *Attorney, Agent, or Firm* — Plager Schack, LLP (57) ABSTRACT

A transportation system which is linked through a common single operating system, in the form of a vacuum tube-link network of transport tubes avoids the limitations of current transportation systems in terms of cost of construction, continuous rising costs of maintenance, limited speed capacity, limited volume capacity, insufficient safety, and vulnerability to environmental and climatic changes. The present invention offers year-round, uninterrupted operation while providing a safe haven at stations for the public during environmental or climatic conditions making sustaining life difficult or impossible. The transportation system of the present invention operates in a contained vacuum tube link environment within which a transport capsule is levitated. Levitation is provided by permanent magnets located in the interior of the transport tube and liquid-cooled super-conducting bulk elements located on the capsule. Cooling may be provided by a fluid such as nitrogen, helium, etc.

15 Claims, 4 Drawing Sheets

AQUATIC AND TERRESTRIAL TRANS-WEB INFRASTRUCTURE NETWORK SYSTEM (T.W.I.N.S.)

CROSS REFERENCE TO RELATED APPLICATIONS

This application claims the priority benefit of U.S. Provisional Application No. 61/512,759 filed on Jul. 28, 2011 which is incorporated herein by reference in its entirety.

BACKGROUND OF THE INVENTION

Current transportation systems including aircraft, various trains, ships and commercial trucks have reached their maximum speed and efficiency capacities. The highest speed attainable by the fastest of these systems, aircraft, can travel safely at approximately 700 mph. Additionally, the inefficiency and time loss brought forth by current transport systems includes a great deal of waste, pollution, limited speed, costly and continuous maintenance and replacement of parts. Furthermore, exposure to delays, travel cancellations due to environmental and climatic conditions as well as lack of ability to adjust to environmental/climatic changes brings great limitations.

Current transportation systems are, and will continue to be, vulnerable to climatic and environmental changes and often stop operating when conditions are not favorable. These above ground systems might be wiped out from climatic or environmental events such as earthquakes, tsunamis, major storms, etc.

The existing transportation systems have served humanity well since their invention. However, they have all reached their functional capacity in a world that is becoming more of an interconnected unit. Thus, a new infrastructure and transportation system is needed that is expandable into a single-standard global system. This is not possible with current systems since they lack a common linking thread.

A single-standard, transportation system and infrastructure would be capable of protecting the life and environment vulnerable to these current and likely continuing cataclysmic environmental and climatic events on earth.

SUMMARY OF THE INVENTION

The system of the present invention is based on an idea analogous to the single global operating system of the internet. In the case of the present invention, a transportation system is provided which is linked through a common single operating system, in the form of a vacuum tube-link network of transport tubes.

A primary object of the present invention is to provide a transportation system which avoids the limitations of current transportation systems in terms of cost of construction, continuous rising costs of maintenance, limited speed capacity, limited volume capacity, insufficient safety, and vulnerability to environmental and climatic changes. The present invention offers year-round, uninterrupted operation while providing a safe haven for the public during environmental or climatic conditions making sustaining life difficult or impossible.

The transportation system of the present invention operates in a contained vacuum tube link environment within which a transport capsule is levitated. Levitation is provided by permanent magnets located in the interior of the transport tube and liquid-cooled super-conducting bulk elements located on the capsule. Cooling may be provided by a fluid such as nitrogen, helium, etc. Greater than conventional speeds are possible within the tubes due to a lack of friction experienced by the capsules. Speeds of 350-4000+ mph are safely attainable.

The proposed transportation system will slowly and eventually replace all current, limited, long-distance transportation systems like High Speed Rail (HSR), bullet-trains, general trains, trucks, aircraft, transport ships, etc. It is not limited, in speed, safety or efficiency.

Transport tube-links are secured by the design against ground motion due to earthquakes.

The system of the present invention is usable in a larger system which also includes an ocean-based tube and station system linked to the present system. Vertical, subterranean mobility for the upper portion of the stations provides additional security for the stations and contents in life-threatening, environmental or climatic conditions occurring outside. All components of this system are designed detached from the soil by design with the ability to sub-merge below ground if/when potentially devastating environmental and climatic events occur.

During implementation, there will be a need for mass education and employment of persons in technologies not yet used in this way. During operation, persons and cargo may be transported at very high speeds and this system provides a greater degree of safety, frequency and efficiency in use. Additionally, as the system is placed in different regions, it allows the opportunity to access all national land locations that otherwise are not available with present transport systems. Thus, a great potential for national and international economic prosperity is provided.

DETAILED DESCRIPTION OF THE INVENTION

Figure 1:
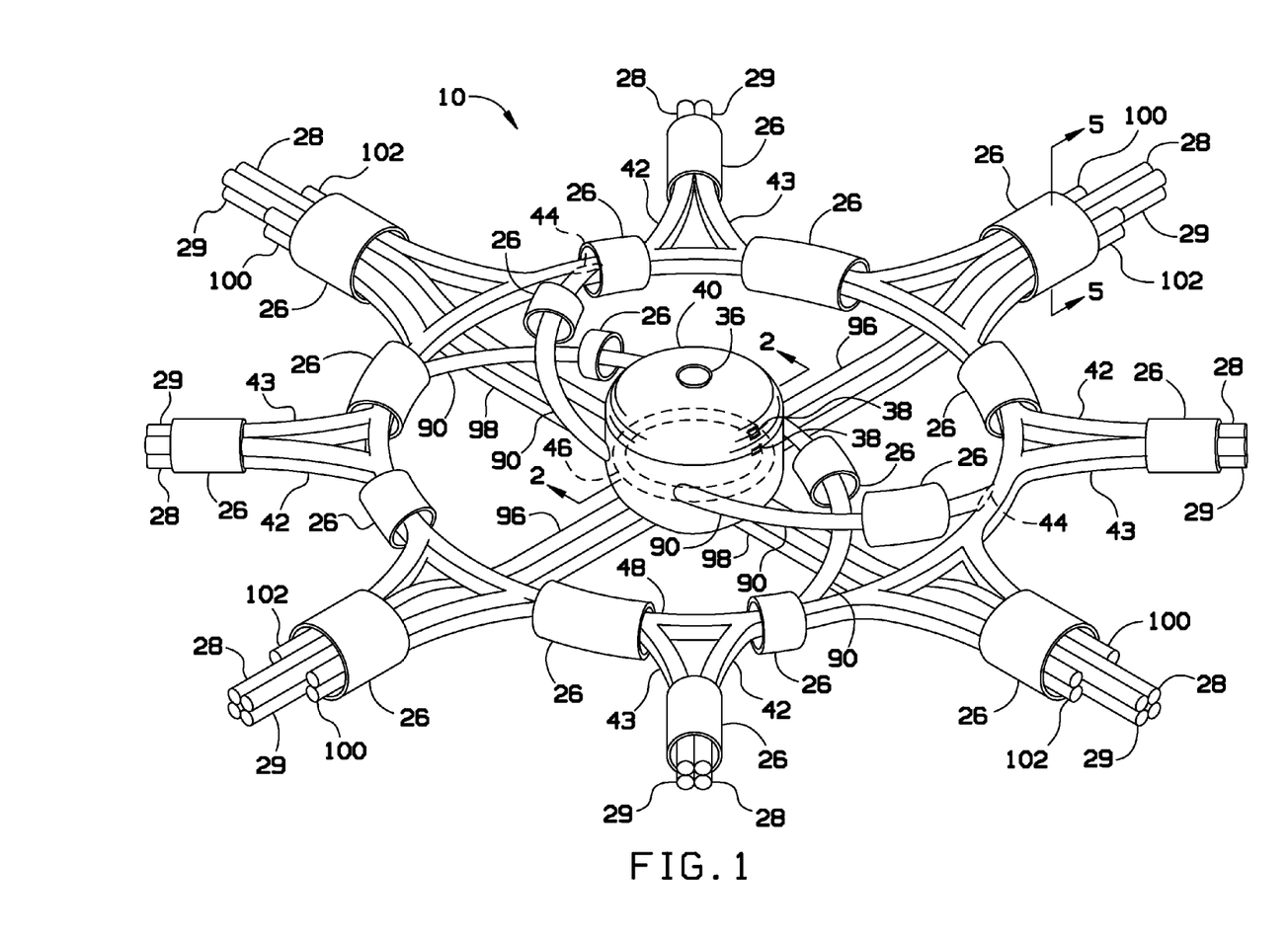
FIG. 1 illustrates a perspective view of the bypass-station and tube network component invention.
Figure 2:
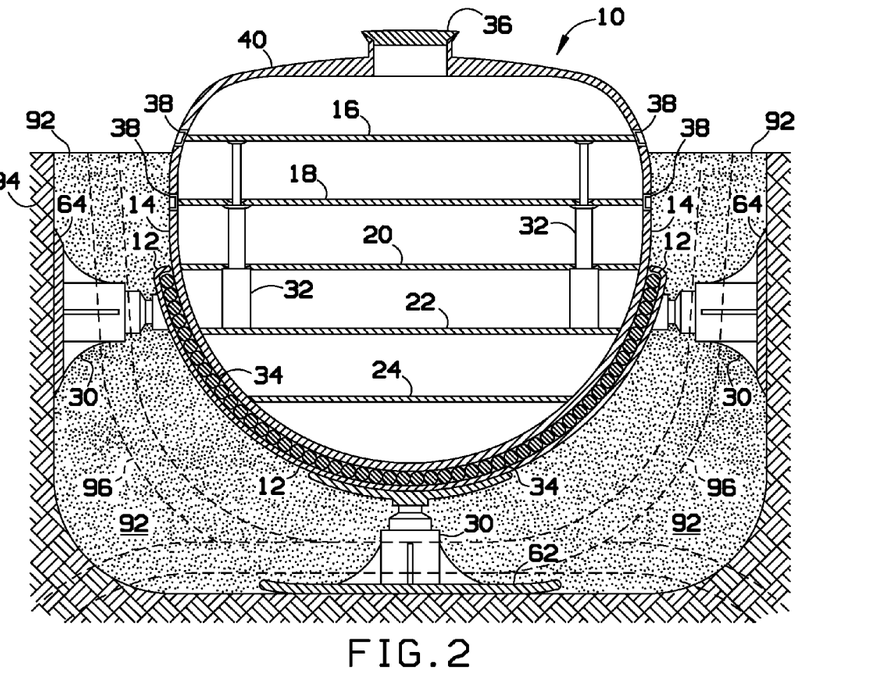
FIG. 2 illustrates a detailed section view of the invention taken along line 2-2 of FIG. 1.
Figure 3:
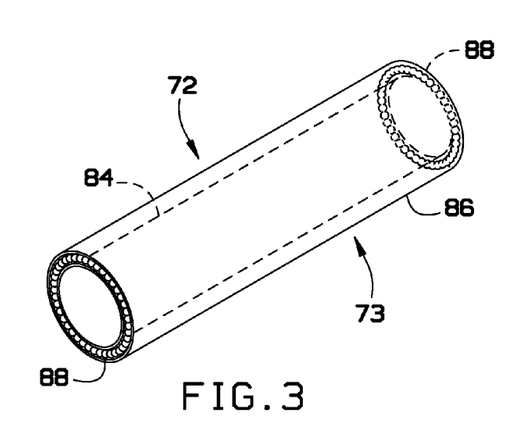
FIG. 3 illustrates a perspective view of the transport tubes and transport capsules of the present invention.
Figure 4:
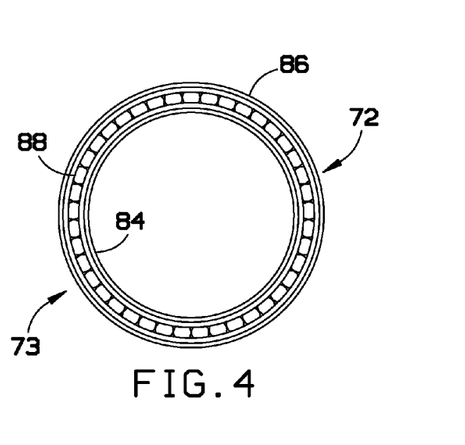
FIG. 4 illustrates a front view of the transport tubes and transport capsules.

The transportation system comprises an interconnected transport tube network including a plurality of passenger transport tube pairs 28 and a plurality of cargo transport tubes 29. Each transport tube pair 28 and 29 further comprises a first upper tube and a second lower tube as seen in FIG. 1. When the transportation system is in use, passenger and cargo transportation is permitted in a first direction in the upper tube of the pair and in a second opposite direction in the lower tube of the pair. Passenger 28 and cargo 29 transport tube pairs are arranged together adjacent one another to form a four tube configuration. The internal diameter of passenger transport tubes is preferably approximately 1.5 m and the internal diameter of the cargo transport tubes is preferably approximately 3.6 m. However, other dimensions may also be used without departing from the scope of the present invention.

A circular outer catch 48 surrounds an intersection of four-tube configurations and provides a slowing mechanism for reducing the speed of passenger and cargo transport capsules 72 and 73. Circular outer catch 48 includes a first catch tube positioned over a second catch tube in an arrangement consistent with that of the transport tube pairs. Similarly, the upper catch tube provides for transportation around outer catch 48 in a first direction and the lower catch tube provides for transportation around outer catch 48 in a second opposite direction.

Near a station 40, each passenger 28 and each cargo 29 transport tube pair diverges at catch 48 into primary passenger transition tube pairs 100 and passenger bypass tube pairs 98. Like the passenger transport tube pairs 28 and second outer catch 48 tubes, passenger transition tubes pairs 100 include upper and lower transition tubes. Similarly, the upper transition tubes provide for transportation in a first direction whereas and the lower transition tubes provide for transportation in a second, opposite direction. A passenger transport capsule is thus able to pass into transition tubes 100 from passenger transport tubes 28 then into outer catch 48. This region of transition into the first catch may be referred to as the passenger primary transition zone.

Also near a station 40, each cargo transport tube pair 29 diverges at catch 48 into primary cargo transition tube pairs 102 and cargo bypass tube pairs 98. Like cargo transport tube pairs 29 and outer catch 48 tubes, primary cargo transition tubes pairs 102 include upper and lower cargo transition tubes. Similarly, the upper tubes transition tubes provide for transportation in a first direction whereas the lower cargo transition tubes provide for transportation in a second, opposite direction. A cargo transport capsule is thus able to pass into transition tube pair 102 from transport tube pair 29 then into outer catch 48. This region of transition into the first catch may be referred to as the primary cargo transition zone.

Internal to the circular outer catch 48 is a circular inner catch 46 also surrounding the intersection of the first passenger transport tube pair and the first cargo transport tube pair with the second passenger transport tube pair and the second cargo transport tube pair and internal to said circular outer catch. Circular inner catch 46 includes a first inner catch tube positioned over a second inner catch tube. As with outer catch 48, the first inner catch tube provides for transportation around inner catch 46 in a first direction and the second inner catch tube provides for transportation around inner catch 46 in a second opposite direction.

Transition of transport capsules 72 and 73 between outer catch 48 and inner catch 46 is made possible by a plurality of secondary passenger and cargo transition tube pairs 90 at a secondary transition zone. A first tube of each of the secondary passenger and cargo transition tube pairs 90 is positioned above a second tube of each of said secondary passenger and cargo transition tube pairs. As with each of the above, the first tube of the secondary passenger and cargo transition tube pairs 90 provides for transportation in a first direction and the second tube of the secondary passenger and cargo transition tube pairs 90 provides for transportation in a second opposite direction.

All transport, transition and catch tubes are evacuated to support the aforementioned frictionless transportation environment.

Figure 5:
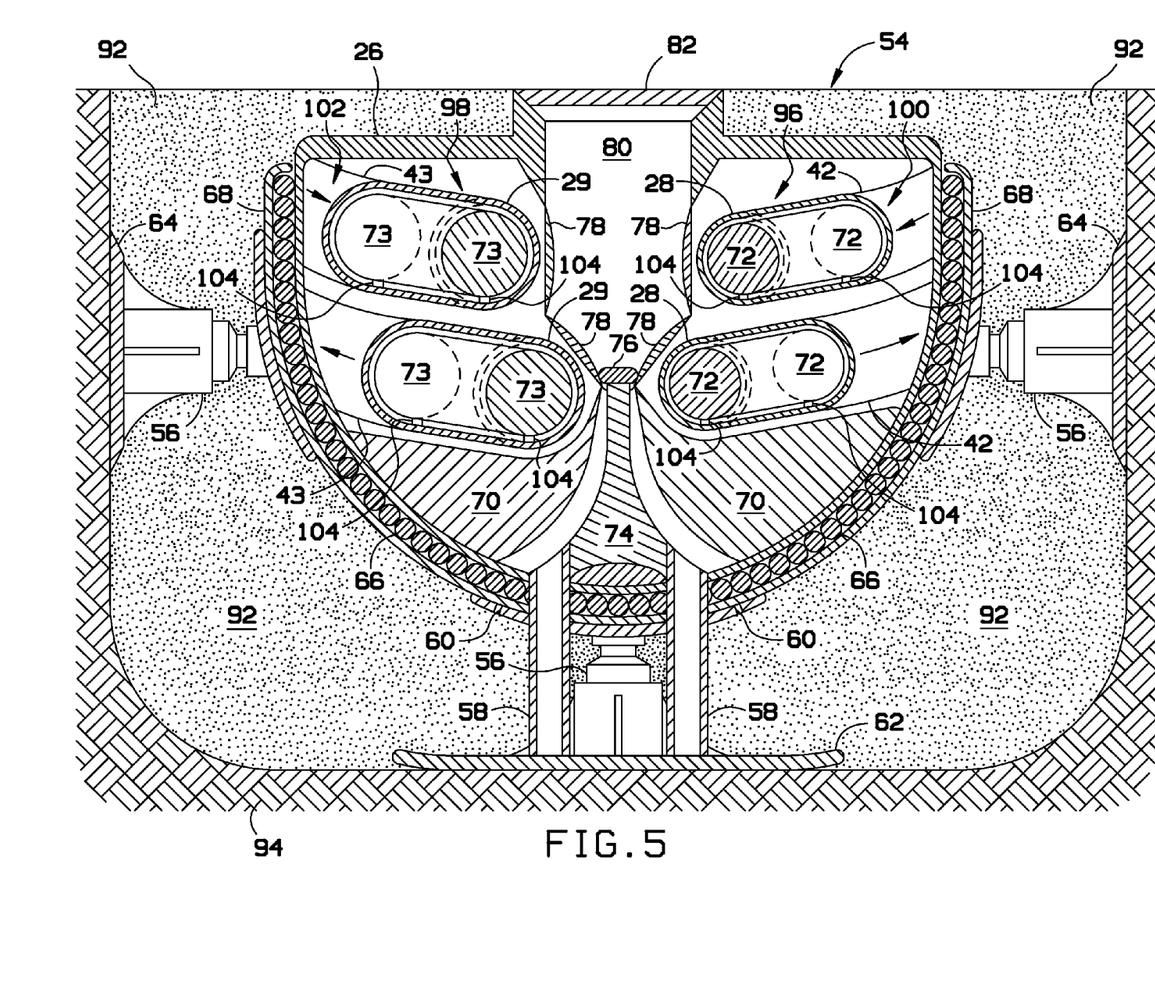
FIG. 5 illustrates a detailed section view of the maglev service and repair station taken along line 5-5 of FIG. 1 showing pairs of transport capsules and transport tubes.

All of the passenger transport tube pairs 28, cargo transport tubes 29, primary passenger transition tubes 100, primary cargo transition tubes 102, secondary cargo and passenger transition tubes 90, as well as outer catch 48 and inner catch 46 are surrounded by a plurality of interconnected containment tube housings 26. As seen in FIG. 5, housings 26 are installed in a cavity in earth 94 and surrounded by fill sand 92. A centralized service and repair cavity 80 is accessible from above ground through a ground-level access panel 82. Transport tube racks 70 are accessible from the centralized service and repair cavity 80 by way of transport tube access panels 78 and capable of which also support passenger 28 and cargo 29 transport tube pairs. A maglev platform 74 internal to containment tube housings 26 and providing access to a centrally-running maglev system 76 capable of elevating a repair person from maglev platform 74 to transport tube access panels 78. Access is necessary for possible repairs and servicing of internal components.

Air filled containment tube housings 26 are supported by ball bearings 66 riding on multi-directional motion platforms 68 allowing for relative motion of containment tube housings 26 relative to the multi-direction motion platforms 68 if necessary to maintain balance and equilibrium if earthquake activity is present. A number of upper hydraulic shock absorbers 56 are provided between the multi-directional motion platform 68 and hydraulic shock mounting platforms 64 at inner surfaces of a cavity in which housings 26 are provided. Additionally, a plurality of lower hydraulic shock absorbers are provided between the multi-directional motion platform 68 and hydraulic shock mounting platforms 62 at an inner surface of the cavity surrounding housings 26. Plates 62 and 64 are not attached to the soil 94 but are flush with the soil cavity.

Transportation stations 40 surrounded by fill sand 92 are provided internal to inner catch 46. Each station 40 includes a lower support arced platform 12 supporting a ball bearing motion system 34 which, in turn, supports a detached station shell 40 to allow for relative motion of station shell 40 relative to the multi-direction lower support arced platform 12 if necessary to maintain balance and equilibrium if earthquake activity is present. Upper hydraulic shock absorbers 30 placeable between the lower support arced platform and inner surfaces of a hole capable of containing the station 40.

An access panel 36 is provided at the top of station 40 permitting access into the station 40. Internally, each station 40 includes a first level 16 closest to a top of the station, a second level 18 below first level 16 and a number of additional levels 20, 22 and 24 below first 16 and second 18 levels. Hydraulic lifts 32 for lifting first 16 and second 18 levels away from the levels 20, 22 and 24. The station 40 would be maintained in an extended configuration with first and second levels 16 and 18 held in their most superior position by catches 38. When damaging environmental conditions exist, first 16 and second 18 levels may be partially collapsed by contraction of hydraulic lifts 32 such that the top of station 40 is level with the surface of the earth.

Passenger loading and unloading platforms 50 are present near a central portion of the station 40 at levels 22 and 24. Cargo loading and unloading platforms 52 are present near a central portion of the station 40 at levels 22 and 24. Levels 22 and 24 remain stationary even upon the need to bring the entire upper three levels 16 and 18 below ground level for safety.

A plurality of passenger maglev transport capsules 72 are propelled within passenger transport tube pairs 28 throughout the interconnected transportation system. A plurality of cargo maglev transport capsules 73 are propelled within the cargo transport tube pairs 29 throughout the interconnected transportation system. Each of the passenger maglev transport capsules 72 and each of the cargo maglev transport capsules comprise a first inner cylinder 84 and a second outer cylinder 86 capable of relative rotation about longitudinal axes due to a plurality of ball bearings 88 provided there between. In this configuration, relative rotation of inner cylinder 84 relative to outer cylinder 86 is permitted to allow passengers and cargo to maintain their position on internal surface of cylinder 84 while travelling around curves. For example if transport capsule were to travel through a portion of transport tubes 28 & 29 curving to the right, inner cylinder 84 would rotate in a clockwise direction. Passenger maglev transport capsules 72 are approximately 1.5-1.8 meters in internal height and 6 meters long. Cargo maglev transport capsules 73 are approximately 2.4-2.5 meters in internal height and 6+ meters long. Transport capsules 72 and 73 are levitated by the combination of permanent magnets and super conducting bulk materials that allow the transport capsule to travel at speeds of 350-4,000+ mph.

A vast amount of sand 92 shall be used to secure the entire transportation tube-link system. A deep ditch or tunnels 94 shall be dug out to encompass the transport containment 26 and inner tube 28 and 29 system. Sand 92 and shock absorbers 30 and 56 are counter-earthquake designs to minimize or eliminate movement within the containment tubes 26 and specifically, protecting the inner transport system.

Figure 6:
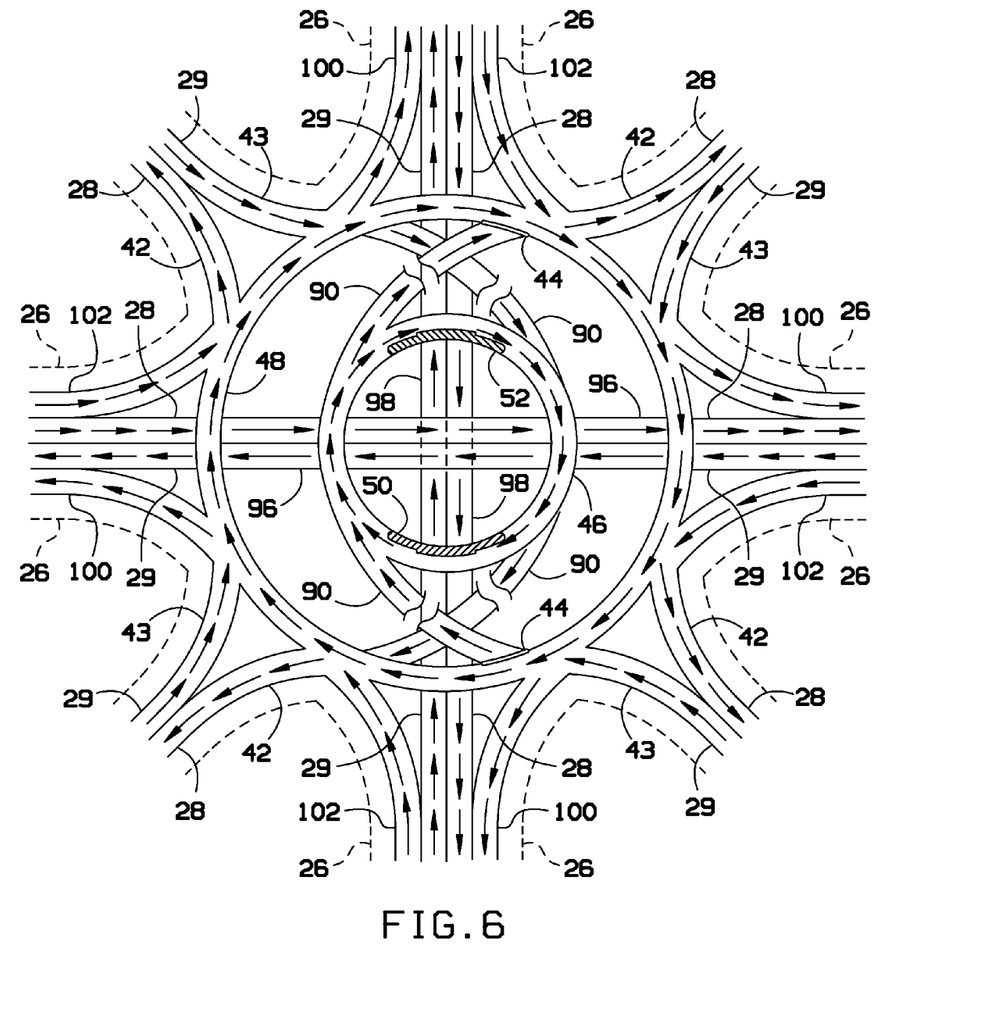
FIG. 6 illustrates a detailed top view of the invention with arrows indicating direction of flow of transport capsules within containment tube housing 26.

A person would use these stations and this airless environment transport system to travel safely within their nation's region and territory at speeds unable to be safely attained by conventional transportation systems (airplanes, super and conventional trains, ships, and trucks). Motion through the transportation system is depicted in FIG. 6. Only one of each vertical pair of transportation, primary transition, outer catch, secondary transition and inner catch tubes has been illustrated. In use, a passenger boards a transport capsule 72 at a platform 50 in a station such as 40. Transport capsule 72 is then accelerated through inner perimeter ring 46 to transition tubes 90 and further, into catch 48. After accelerating to the desired velocity and orienting to the appropriate direction, capsule 72 leaves catch 48 through one of transport tubes 28 and travels to the destination station.

As a passenger transport capsule 72 approaches a station 40, the capsule 72 may either bypass the station 40 by continuing through bypass tubes 96 and 98 or may stop for passenger deposit or uptake by transitioning into transition tube pairs 100.

If making a stop, transport capsule 72 is propelled through transition tube pairs 100, is transported into catch 48 where it is decelerated. Then transport capsule 72 is propelled into transition tubes 90 through entry points 44. Upon entry into inner perimeter ring 46, transport capsule 72 may undergo further deceleration before coming to a stop at cargo loading/unloading platform 52.

To use for cargo, cargo is loaded into a cargo transport capsule 73 at a platform 52 in a station such as 40. Cargo transport capsule 73 is then accelerated through inner perimeter ring 46 to transition tubes 90 and further, into catch 48. After accelerating to the desired velocity and positioning to the appropriate direction, capsule 73 leaves catch 48 through one of cargo transport tubes 29 and travels to a destination station.

As a cargo transport capsule 73 approaches a station 40, the capsule 73 may either bypass the station 40 by continuing through bypass tubes 96 and 98 or may stop for passenger deposit or uptake by transitioning into transition tube pairs 102.

If making a stop, transport capsule 73 is propelled through transition tube pairs 102, is transported into catch 48 where it is decelerated. Then transport capsule 73 is propelled into transition tubes 90 through entry points 44. Upon entry into inner perimeter ring 46, transport capsule 73 may undergo further deceleration before coming to a stop at cargo loading/unloading platform 52.

A variety of software programs will be necessary and used for timing of the distance to be maintained by the traveling capsule and monitoring speeds of the capsules including slowing and accelerating. Additionally, public security and climate control features within each station and within the transport system will also need to be monitored.

This system is most effective when established as an infrastructure foundation for a regional, national and international single-standard transportation system. The initial options to travel from point to point are only limited by the number of stations established. The land-based transport system is expanded from the stations to other locations around the stations at a minimal of 200+/− miles from each station and the offshoots from the main line between station points extending to/from smaller portal locations in other land-based region within a region or nation's territory. As the system expands with more extensions and capsules, more locations shall be available to more destination points and until such time that the entire land region is covered by this infrastructure system and expanded in the near future to oceanic transport.

Once the entire undertaking is completed, this facility shall be commercially productive from internal farming development, commercial enterprises, and other business related activities. Each station is designed with a capsule entry 'Catch' located around the perimeter of each station and located approximately one mile away from the stations, and are air-filled to control incoming speeds to the physical Station.

Buildings like atomic reactors, general housing and any commercial construction that may have need of this counter-earthquake, climatic and environmental design idea. This would include this innovation's design whereby application of shock absorbers, hydraulic lifts, detached contact plates, and outer-station's sand-based containment environment that is located between the station and soil-cavity is included in the design idea which is used to secure and greatly limit motion of all structures within (i.e. station frame housing and transport system network).

The components of this innovation are established as implied herein and cannot be interchangeable even though other transport applications may be initiated if the vacuum designed system fails. In such a case, the internal transport system's vacuum may be modified to an air system. If magnetic levitation is compromised, then wheeled vehicles would need to be created to continue access to the already routed system, realizing that the speed capacity would be greatly reduced and have none or limited advantage over existing transportation systems would be possible.

This innovation may be used and not limited to other applications such that are designed for counter-earth motion (i.e. earthquakes) and climatic and environmental defense purposes.

While the invention has been described for use in a subterranean transportation system, the components may be adapted to provide transportation above ground and aquatically as well.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

I claim:

1. A transportation system comprising:
an interconnected vacuum tube network including:

a plurality of passenger transport tube pairs, wherein a first tube of each of said passenger transport tube pairs is positioned above a second tube of each said passenger transport tube pairs;
a plurality of cargo transport tube pairs, wherein a first tube of each of said cargo transport tube pairs is positioned above a second tube of each of said cargo transport tube pairs;
wherein a first passenger transport tube pair is positioned adjacent a first cargo transport tube pair;
wherein a second passenger transport tube pair is positioned adjacent a second cargo transport tube pair;
a circular outer catch surrounding an overlap of said adjacent first passenger and cargo transport tube pairs with said adjacent second passenger and cargo transport tube pairs, said circular catch including a first catch tube positioned over a second catch tube;
a plurality of primary passenger transition tube pairs, wherein a first tube of each of said primary passenger transition tube pairs is positioned above a second tube of each of said primary passenger transition tube pairs and wherein said first and second tubes of each of said primary passenger transition tube pairs are respectively joined to said first and second tubes of said passenger transport tube pairs in a primary passenger transition zone;
a plurality of primary cargo transition tube pairs, wherein a first tube of each of said primary cargo transition tube pairs is positioned above a second tube of each of said primary cargo transition tube pairs and wherein said first and second tubes of said primary cargo transition tube pairs are respectively joined to said first and second tubes of said cargo transport tube pairs in a primary cargo transition zone;
wherein said first and second tubes of each of said plurality of primary passenger transition tube pairs are joined to respective tubes of said outer catch tube pair near said transition zone;
wherein said first and second tubes of each of said plurality of primary cargo transition tube pairs are joined to the same respective tubes of said outer catch tube pair as said plurality of primary passenger tube pairs near said transition zone;
a circular inner catch surrounding said overlap of said adjacent first passenger and cargo transport tube pairs with said adjacent second passenger and cargo transport tube pairs, said circular catch including a first catch tube positioned over a second catch tube and internal to said circular outer catch, said circular inner catch including a first inner catch tube positioned over a second inner catch tube;
a plurality of secondary passenger transition tube pairs, wherein a first tube of each of said secondary passenger transition tube pairs is positioned above a second tube of each of said secondary passenger transition tube;
a plurality of secondary cargo transition tube pairs, wherein a first tube of each of said secondary cargo transition tube pairs is positioned above a second tube of each of said secondary cargo transition tube;
wherein said first and second tubes of each said plurality of secondary passenger transition tube pairs are joined to respective tubes of said inner catch near said secondary transition zone;
wherein said first and second tubes of each of said plurality of secondary cargo transition tube pairs are joined to the same respective tubes of said inner catch tube pair as said plurality of primary passenger tube pairs near said secondary transition zone;
wherein said first tube of each of said plurality of secondary passenger transition tube pairs is joined to said first inner catch tube;
wherein said first tube of each of said plurality of secondary cargo transition tube pairs is joined to said first inner catch tub;
wherein said second tube of each of said plurality of secondary passenger transition tube pairs is joined to said second inner catch;
wherein said second tube of each of said plurality of secondary cargo transition tube pairs is joined to said second inner catch;
a plurality of containment tube housings surrounding said passenger and cargo transport tubes and said primary and secondary passenger and cargo transition tubes, said containment tube housings including:
  a centralized service and repair cavity accessible from above ground through a ground-level access panel;
  transport tube racks accessible from the centralized service and repair cavity by way of transport tube access panels and capable of supporting passenger and cargo transport tubes;
  a multi-directional motion platform for supporting each containment tube housing;
  a first ball bearing motion system provided between each containment tube housing and said multi-directional motion platform and allowing for relative motion of said motion platform and said containment tube housing;
  side hydraulic shock absorbers placeable between the multi-directional motion platform and hydraulic shock mounting platforms at inner surfaces of a hole capable of containing said containment tube housings;
  bottom hydraulic shock absorbers placeable between the multi-directional motion platform and hydraulic shock mounting platforms at inner surfaces of a hole capable of containing said containment tube housings;
  hydraulic shock absorber access shafts providing access between an interior of said containment tube housing and said bottom hydraulic shock absorbers;
  a maglev platform internal to said containment tube housings and providing access to a maglev transport capable of elevating a repair person from said maglev platform to said transport tube access panels;
a plurality of stations surrounded by fill sand, each station including:
  a lower support arced platform;
  a detached station shell;
  hydraulic shock absorbers placeable between the lower support arced platform and inner surfaces of a hole capable of containing said station;
  a ball bearing motion system provided between said arced platform and said shell and allowing for relative motion of said arced platform and said station shell;
  an access panel at the top of the station providing access into said station;
  a first level closest to a top of the station;
  a second level below the first level;
  a plurality of additional levels below said first and second levels;
  hydraulic lifts for lifting said first and second levels away from said additional levels;

level locks capable of locking said first and second levels in place after lifting of said first and second levels by said hydraulic lifts;

a passenger loading platform providing access to said first inner catch tube;

a passenger unloading platform to said second inner catch tube;

a cargo loading platform providing access to said first inner catch tube;

a cargo unloading platform providing access to said second inner catch tube;

a plurality of passenger maglev transport capsules for propulsion within said passenger transport tubes;

a plurality of cargo maglev transport capsules for propulsion within said cargo transport tubes;

wherein each of said plurality of passenger maglev transport capsules and each of said plurality of cargo maglev transport capsules comprising a first inner cylinder and a second outer cylinder wherein said inner cylinder is capable of rotation relative to said outer cylinder due to a plurality of ball bearings provided therebetween.

2. A transportation system comprising:

an interconnected vacuum tube network including:

a plurality of passenger transport tube pairs;

a plurality of cargo transport tube pairs;

wherein a first passenger transport tube pair is positioned adjacent a first cargo transport tube pair;

wherein a second passenger transport tube pair is positioned adjacent a second cargo transport tube pair;

a circular outer catch surrounding an overlap of said adjacent first passenger and cargo transport tube pairs with said adjacent second passenger and cargo transport tube pairs;

a plurality of primary passenger transition tube pairs;

a plurality of primary cargo transition tube pairs;

a circular inner catch surrounding said overlap of said adjacent first passenger and cargo transport tube pairs with said adjacent second passenger and cargo transport tube pairs, said circular catch including a first catch tube positioned over a second catch tube and internal to said circular outer catch;

a plurality of secondary passenger transition tube pairs;

a plurality of secondary cargo transition tube pairs;

a plurality of containment tube housings surrounding said passenger and cargo transport tubes and said primary and secondary passenger and cargo transition tubes;

a plurality of stations surrounded by fill sand;

a plurality of passenger maglev transport capsules for propulsion within said passenger transport tubes; and a plurality of cargo maglev transport capsules for propulsion within said cargo transport tubes.

3. A transportation system as set forth in claim 2, wherein:

a first tube of each of said passenger transport tube pairs is positioned above a second tube of each said passenger transport tube pairs;

a first tube of each of said cargo transport tube pairs is positioned above a second tube of each of said cargo transport tube pairs;

said circular catch includes a first catch tube positioned over a second catch tube;

a first tube of each of said primary passenger transition tube pairs is positioned above a second tube of each of said primary passenger transition tube pairs and wherein said first and second tubes of each of said primary passenger transition tube pairs are respectively joined to said first and second tubes of said passenger transport tube pairs in a primary passenger transition zone;

a first tube of each of said primary cargo transition tube pairs is positioned above a second tube of each of said primary cargo transition tube pairs and wherein said first and second tubes of said primary cargo transition tube pairs are respectively joined to said first and second tubes of said cargo transport tube pairs in a primary cargo transition zone;

wherein said first and second tubes of each of said plurality of primary passenger transition tube pairs are joined to respective tubes of said outer catch tube pair near said transition zone;

wherein said first and second tubes of each of said plurality of primary cargo transition tube pairs are joined to the same respective tubes of said outer catch tube pair as said plurality of primary passenger tube pairs near said transition zone.

4. A transportation system as set forth in claim 3, wherein:

said circular inner catch including a first inner catch tube positioned over a second inner catch tube;

a first tube of each of said secondary passenger transition tube pairs is positioned above a second tube of each of said secondary passenger transition tube pairs;

a first tube of each of said secondary cargo transition tube pairs is positioned above a second tube of each of said secondary cargo transition tube pairs;

said first and second tubes of each said plurality of secondary passenger transition tube pairs are joined to respective tubes of said inner catch near said secondary transition zone;

said first and second tubes of each of said plurality of secondary cargo transition tube pairs are joined to the same respective tubes of said inner catch tube pair as said plurality of primary passenger tube pairs near said secondary transition zone;

said first tube of each of said plurality of secondary passenger transition tube pairs is joined to said first inner catch tube;

said first tube of each of said plurality of secondary cargo transition tube pairs is joined to said first inner catch tube;

said second tube of each of said plurality of secondary passenger transition tube pairs is joined to said second inner catch; and wherein said second tube of each of said plurality of secondary cargo transition tube pairs is joined to said second inner catch.

5. A transportation system as set forth in claim 2, wherein:

said containment tube housings include a centralized service and repair cavity accessible from above ground through a ground-level access panel;

transport tube racks accessible from the centralized service and repair cavity by way of transport tube access panels and capable of supporting passenger and cargo transport tubes;

a multi-directional motion platform for supporting each containment tube housing;

a first ball bearing motion system provided between each containment tube housing and said multi-directional motion platform and allowing for relative motion of said motion platform and said containment tube housing;

side hydraulic shock absorbers placeable between the multi-directional motion platform and hydraulic shock mounting platforms at inner surfaces of a hole capable of containing said containment tube housings;

bottom hydraulic shock absorbers placeable between the multi-directional motion platform and hydraulic shock mounting platforms at inner surfaces of a hole capable of containing said containment tube housings;

hydraulic shock absorber access shafts providing access between an interior of said containment tube housing and said bottom hydraulic shock absorbers;

a maglev platform internal to said containment tube housings and providing access to a maglev transport capable of elevating a repair person from said maglev platform to said transport tube access panels.

6. A transportation system as set forth in claim 2, wherein:

each said station includes:
- a lower support arced platform;
- a detached station shell;
- hydraulic shock absorbers placeable between the lower support arced platform and inner surfaces of a hole capable of containing said station;
- a ball bearing motion system provided between said arced platform and said shell and allowing for relative motion of said arced platform and said station shell;
- an access panel at the top of the station providing access into said station;
- a first level closest to a top of the station;
- a second level below the first level;
- a plurality of additional levels below said first and second levels;
- hydraulic lifts for lifting said first and second levels away from said additional levels;
- level locks capable of locking said first and second levels in place after lifting of said first and second levels by said hydraulic lifts;
- a passenger loading platform providing access to said first inner catch tube;
- a passenger unloading platform to said second inner catch tube;
- a cargo loading platform providing access to said first inner catch tube;
- a cargo unloading platform providing access to said second inner catch tube.

7. The transportation system as set forth in claim 2, wherein:

each of said plurality of passenger maglev transport capsules and each of said plurality of cargo maglev transport capsules comprise a first inner cylinder and a second outer cylinder.

8. The transportation system as set forth in claim 7, wherein:

said inner cylinder is capable of rotation relative to said outer cylinder due to a plurality of ball bearings provided therebetween.

9. A transportation system comprising:

an interconnected vacuum tube network including:
- a plurality of passenger transport tube pairs;
- a plurality of cargo transport tube pairs;
- wherein a first passenger transport tube pair is positioned adjacent a first cargo transport tube pair;
- wherein a second passenger transport tube pair is positioned adjacent a second cargo transport tube pair;
- a circular outer catch surrounding an overlap of said adjacent first passenger and cargo transport tube pairs with said adjacent second passenger and cargo transport tube pairs;
- a plurality of primary passenger transition tube pairs;
- a plurality of primary cargo transition tube pairs;
- a circular inner catch surrounding said overlap of said adjacent first passenger and cargo transport tube pairs with said adjacent second passenger and cargo transport tube pairs, said circular catch including a first catch tube positioned over a second catch tube and internal to said circular outer catch;
- a plurality of secondary passenger transition tube pairs;
- a plurality of secondary cargo transition tube pairs.

10. A transportation system as set forth in claim 9, wherein:

a first tube of each of said passenger transport tube pairs is positioned above a second tube of each said passenger transport tube pairs;

a first tube of each of said cargo transport tube pairs is positioned above a second tube of each of said cargo transport tube pairs;

said circular catch includes a first catch tube positioned over a second catch tube;

a first tube of each of said primary passenger transition tube pairs is positioned above a second tube of each of said primary passenger transition tube pairs and wherein said first and second tubes of each of said primary passenger transition tube pairs are respectively joined to said first and second tubes of said passenger transport tube pairs in a primary passenger transition zone;

a first tube of each of said primary cargo transition tube pairs is positioned above a second tube of each of said primary cargo transition tube pairs and wherein said first and second tubes of said primary cargo transition tube pairs are respectively joined to said first and second tubes of said cargo transport tube pairs in a primary cargo transition zone;

wherein said first and second tubes of each of said plurality of primary passenger transition tube pairs are joined to respective tubes of said outer catch tube pair near said transition zone;

wherein said first and second tubes of each of said plurality of primary cargo transition tube pairs are joined to the same respective tubes of said outer catch tube pair as said plurality of primary passenger tube pairs near said transition zone.

11. A transportation system as set forth in claim 10, wherein:

said circular inner catch including a first inner catch tube positioned over a second inner catch tube;

a first tube of each of said secondary passenger transition tube pairs is positioned above a second tube of each of said secondary passenger transition tube pairs;

a first tube of each of said secondary cargo transition tube pairs is positioned above a second tube of each of said secondary cargo transition tube pairs;

said first and second tubes of each said plurality of secondary passenger transition tube pairs are joined to respective tubes of said inner catch near said secondary transition zone;

said first and second tubes of each of said plurality of secondary cargo transition tube pairs are joined to the same respective tubes of said inner catch tube pair as said plurality of primary passenger tube pairs near said secondary transition zone;

said first tube of each of said plurality of secondary passenger transition tube pairs is joined to said first inner catch tube;

said first tube of each of said plurality of secondary cargo transition tube pairs is joined to said first inner catch tube;

said second tube of each of said plurality of secondary passenger transition tube pairs is joined to said second inner catch; and wherein said second tube of each of said plurality of secondary cargo transition tube pairs is joined to said second inner catch.

12. The transportation system of claim 11 further comprising:
 a plurality of containment tube housings surrounding said passenger and cargo transport tubes and said primary and secondary passenger and cargo transition tubes, said containment tube housings including:
  a centralized service and repair cavity accessible from above ground through a ground-level access panel;
  transport tube racks accessible from the centralized service and repair cavity by way of transport tube access panels and capable of supporting passenger and cargo transport tubes;
 a multi-directional motion platform for supporting each containment tube housing;
 a first ball bearing motion system provided between each containment tube housing and said multi-directional motion platform and allowing for relative motion of said motion platform and said containment tube housing;
 side hydraulic shock absorbers placeable between the multi-directional motion platform and hydraulic shock mounting platforms at inner surfaces of a hole capable of containing said containment tube housings;
 bottom hydraulic shock absorbers placeable between the multi-directional motion platform and hydraulic shock mounting platforms at inner surfaces of a hole capable of containing said containment tube housings;
 hydraulic shock absorber access shafts providing access between an interior of said containment tube housing and said bottom hydraulic shock absorbers; and
 a maglev platform internal to said containment tube housings and providing access to a maglev transport capable of elevating a repair person from said maglev platform to said transport tube access panels.

13. The transportation system as set forth in claim 11, further comprising:
 a plurality of stations surrounded by fill sand, each station including:
  a lower support arced platform;
  a detached station shell;
  hydraulic shock absorbers placeable between the lower support arced platform and inner surfaces of a hole capable of containing said station;
  a ball bearing motion system provided between said arced platform and said shell and allowing for relative motion of said arced platform and said station shell;
  an access panel at the top of the station providing access into said station;
  a first level closest to a top of the station;
  a second level below the first level;
  a plurality of additional levels below said first and second levels;
  hydraulic lifts for lifting said first and second levels away from said additional levels;
  level locks capable of locking said first and second levels in place after lifting of said first and second levels by said hydraulic lifts;
  a passenger loading platform providing access to said first inner catch tube;
  a passenger unloading platform to said second inner catch tube;
  a cargo loading platform providing access to said first inner catch tube; and
  a cargo unloading platform providing access to said second inner catch tube.

14. The transportation system as set forth in claim 11, further comprising:
 a plurality of passenger maglev transport capsules for propulsion within said passenger transport tubes;
 a plurality of cargo maglev transport capsules for propulsion within said cargo transport tubes;
 wherein each of said plurality of passenger maglev transport capsules and each of said plurality of cargo maglev transport capsules comprising a first inner cylinder and a second outer cylinder wherein said inner cylinder is capable of rotation relative to said outer cylinder due to a plurality of ball bearings provided therebetween.

15. The transportation system as set forth in claim 9, further comprising:
 a plurality of passenger maglev transport capsules for propulsion within said passenger transport tubes;
 a plurality of cargo maglev transport capsules for propulsion within said cargo transport tubes;
 wherein each of said plurality of passenger maglev transport capsules and each of said plurality of cargo maglev transport capsules comprising a first inner cylinder and a second outer cylinder wherein said inner cylinder is capable of rotation relative to said outer cylinder due to a plurality of ball bearings provided therebetween.

* * * * *